(12) United States Patent
Tacke

(10) Patent No.: US 7,283,276 B2
(45) Date of Patent: Oct. 16, 2007

(54) METHOD AND SYSTEM FOR PRODUCING PROOF DATA FOR PACKAGE PRINTING

(75) Inventor: Marco Tacke, Melsdorf (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 1117 days.

(21) Appl. No.: 10/243,065

(22) Filed: Sep. 13, 2002

(65) Prior Publication Data

US 2003/0098994 A1   May 29, 2003

(30) Foreign Application Priority Data

Nov. 27, 2001   (DE) ................................ 101 58 083

(51) Int. Cl.
*G06K 1/00* (2006.01)
(52) U.S. Cl. ...................... 358/1.18; 358/1.1; 358/1.6; 53/131.4; 53/458; 700/182
(58) Field of Classification Search ............... 358/1.18, 358/1.1, 1.6, 2.1; 53/411, 458, 131.2, 131.4; 101/483; 700/182
See application file for complete search history.

(56) References Cited

U.S. PATENT DOCUMENTS

| | | | | |
|---|---|---|---|---|
| 4,737,825 A | * | 4/1988 | Davis | ........................... 355/54 |
| 5,838,360 A | * | 11/1998 | Harrold et al. | ............. 347/258 |
| 6,689,035 B1 | * | 2/2004 | Gerber | ........................ 493/320 |

* cited by examiner

*Primary Examiner*—Kimberly A. Williams
(74) *Attorney, Agent, or Firm*—Laurence A. Greenberg; Werner H. Stemer; Ralph E. Locher

(57) ABSTRACT

A method for producing proof data for a blank of a package in an electronic reproduction system for packages includes linking CAD data from a CAD system and graphic data from a graphic system to form blank data, and using the blank data in a sheet assembly system to produce printing data describing a printed sheet. From a blank of the finished assembled printed sheet, proof data for output in a proof system is derived, the proof data containing all the changes to the graphic data of the blank that have been made in the sheet assembly system. The proof data can describe a two-dimensional or three-dimensional proof.

17 Claims, 5 Drawing Sheets

METHOD AND SYSTEM FOR PRODUCING PROOF DATA FOR PACKAGE PRINTING

BACKGROUND OF THE INVENTION

Field of the Invention

The invention relates to the field of electronic reproduction technology and pertains to a method and system for producing proof data for a blank of a package in package printing. The proof data contain, for example, a two-dimensional development of a folding box, including all the texts, graphics, and image contents on the side surfaces of the folding box (2-D proof). After the proof data have been printed out on a color printer, the reproduction work can be checked for freedom from faults, color quality, and so on before the start of printing the edition. If the proof data are printed out on a board material, the printed 2-D proof can also be folded and glued together to form a pattern of the folding box to assess the physical effect. To an increasing extent, proof data are also being generated that contains a three-dimensional description of the package to be printed (3-D proof). Using specific computer programs, a three-dimensional illustration of the package can be calculated from such proof data, and is displayed on a monitor. In such a case, the package displayed can be viewed from all sides by interactive rotation, a number of identical packages can be placed beside one another, and so on, so that the advertising effect of the package can be assessed still better. The 3-D proof data also have the advantage that they can easily be transmitted through communications connections. As such, coordination between the client, the advertising agency and the print shop relating to changes that may still be required can be carried out quickly and cost-effectively.

FIG. 1 illustrates the working sequence in a conventional reproduction system for packages. The sequence will be explained for a folding box that is to be printed on board and, following folding and gluing together, is to be used, for example, to package biscuits. Using a specifically adapted computer program in a CAD system 1 for the construction of packages, the unwound folding box is constructed, CAD data 2 being produced that describe at least the outlines 11 and the folding lines 12 of the unwound folding box. FIG. 2 shows the constructed folding box. The outlines 11 and the folding lines 12 also define the surfaces (Surface 1 to Surface 6 of FIG. 2) of the folding box onto which an image/text content is to be printed respectively. Appended to these surfaces are gluing edges 13, with which the folding box is glued together following folding. The CAD data 2 can be produced, for example, in the common file format (CFF) data format that is specific to the packaging industry or in the format of one of the usual configuration programs, for example, in the DXF format from the AutoCAD program.

In a further working step, in a graphic system 3 using the conventional ways of electronic reproduction technology, for example, various computer programs for layout configuration, image processing, and text processing, the image/text contents that are to be printed onto Surfaces 1 to 6 of the folding box are produced and configured. The graphic data 4 produced in the process for each surface to be printed are shown in FIG. 3. To simplify the representation, different hatching identifies the image/text contents that are different for Surfaces 1 to 6. The graphic data 4 can be produced, for example, in the format of a page description language such as PostScript or portable document format (PDF).

In the next working step, the graphic data 4 and the CAD data 2 are linked in a blank assembly system 5, by positioning the graphic data 4 on Surfaces 1 to 6 defined by the CAD data 2, that is to say, the geometric association between the graphic data 4 and the CAD data 2 is defined. The graphic data 4 are normally reproduced with a trim allowance, that is to say, somewhat larger than Surfaces 1 to 6 to be printed. During the blank assembly, there is, then, sufficient freedom with respect to the accurate position of the graphic data 4. For example, it is possible to allow the graphic data 4 to project somewhat into the gluing edges 13 to prevent unprinted strips being visible after the folding box has been glued together. Where the graphic data 4 of two adjacent surfaces adjoin one another directly, the overlapping trim allowances will be cut off. The blank data 6 so produced describe a blank 14 of the unwound folding box with respect to the shape of the folding box and the content of Surfaces 1 to 6. FIG. 4 illustrates the blank 14 described by the blank data 6.

In a further working step, the blank data 6 are used to derive the proof data 8 for a two-dimensional (2-D) proof and a three-dimensional (3-D) proof and are transmitted to a proof system 7, where they are displayed or printed out. FIG. 5 shows, as an example, a 3-D proof as displayed on the monitor 20 of the proof system 7.

Finally, in a sheet assembly system 9, repeating the blank 14 many times on the surface of a printed sheet 15 produces the printing data 10 for the printed sheet 15. FIG. 6 shows an example of the configuration of a plurality of blanks 14 on the printed sheet 15. As shown at the boundary line 16 in FIG. 6, the blanks 14 are often placed directly adjacent to one another to utilize the space available as efficiently as possible. Furthermore, in the sheet assembly system 9, the elements that are usual for the control of the printing are assembled, such as register crosses 17 and a print control strip 18, which is put together from colored areas with different coloration. The printing data 10 describe how great a proportion of the printing inks is to be printed at each point of the printed sheet 15, for example, for the four standard printing inks cyan, magenta, yellow, and black (CMYK). In package printing, however, use is often made of additional special printing inks, for example, a special chocolate brown, so that the printing data 10, as a rule, describe the proportions of more than four printing inks. Nowadays, the printing data 10 are usually produced in the format of a page description language such as PostScript or portable document format (PDF). Using the printing data 10 for each printing ink, a printing plate is then produced to prepare the print, for example, by exposing the printing data 10 in a plate exposer. Following the printing of the packages, the blanks 14 are punched out of the printed board sheets and the folding boxes are produced by folding and gluing.

In the working sequence explained, it was assumed, for clarity, that the CAD system 1, the graphic system 3, and the blank assembly system 5 are separate computer systems. In actual fact, however, they may also be separate functions or application programs that are integrated in one or two personal computers or other computer systems. For example, the CAD system 1 and the blank assembly system 5 can be combined in one computer system, the graphic data 4 then being imported from a separate graphic system 3, or all three functions are combined in the same computer system.

In the conventional working sequence explained, it is often also the case that late changes are made to the blank data 6 in the sheet assembly system 9. Such changes result from production conditions that have changed in the short term in the machines involved in the package production, such as printing machine, punch, folding machine, gluing machine, for example, the change to another punch that has greater tolerances than a punch initially provided. In such a case, it is expedient, for example, to enlarge the trim allowances of the graphic data 4 at some points in retrospect in the sheet assembly system 9. In FIG. 7, such a concern is illustrated by using the example of two blanks 14 that lay one above the other and touch at the boundary line 16. The trim allowance at the lower edge of the graphic data 4 for Surface 3 has been enlarged. Even if, because of the greater tolerance of the punch, the punching is displaced downward somewhat, the surface 3 in the package punched out still contains only the image/text content associated with it. Without enlarging the trim allowance downward, Surface 3 in the punched-out package would have had a white stripe at the lower edge that, in the case of the upper blank 14, is part of the gluing edge 13 of the lower blank 14.

In the conventional working sequence for the electronic reproduction of a package, it is disadvantageous that changes to the blank data 6 that are performed in the sheet assembly system 9 are not contained in the proof data 8 and cannot, therefore, be seen in the 2-D proof or 3-D proof.

SUMMARY OF THE INVENTION

It is accordingly an object of the invention to provide a method and system for producing proof data for a blank of a package in package printing that overcomes the hereinafore-mentioned disadvantages of the heretofore-known devices and methods of this general type and that does not have the disadvantage that changes to the blank data performed in the sheet assembly system are not contained in the proof data and cannot, therefore, be seen in the 2-D proof or 3-D proof, and that offers the possibility of producing proof data that agree exactly with the package subsequently produced.

With the foregoing and other objects in view, there is provided, in accordance with the invention, a method of producing proof data for a blank of a package in an electronic reproduction system for packages, including the steps of linking CAD data and graphic data to form blank data, producing, from the blank data, printing data describing a printed sheet having the blank, and deriving the proof data from the blank of the printing data.

In accordance with another mode of the invention, the proof data contain all changes to the graphic data from the blank, the changes having been made during the production of the printing data.

In accordance with a further mode of the invention, the graphic data is changed during production of the printing data, and the proof data is derived from the blank including all the changes made to the graphic data during the production of the printing data.

In accordance with an additional mode of the invention, the proof data is derived from a blank of the printing data with the proof data describing a two-dimensional proof.

In accordance with yet another mode of the invention, a two-dimensional proof is described with the proof data.

In accordance with yet a further mode of the invention, the proof data describes a three-dimensional proof.

In accordance with yet an added mode of the invention, the proof data is derived from a blank of the printing data with the proof data describing a three-dimensional proof.

In accordance with yet an additional mode of the invention, a three-dimensional proof is described with the proof data.

In accordance with again another mode of the invention, the proof data is passed on to a proof system for output.

In accordance with again a further mode of the invention, the proof data is output by passing the proof data on to a proof system.

With the objects of the invention in view, there is also provided a method of producing proof data for a blank of a package, including the steps of providing an electronic reproduction system for packages, linking CAD data and graphic data with the electronic reproduction system to form blank data, producing printing data describing a printed sheet with the electronic reproduction system utilizing the blank data, the printing data describing the blank, and deriving proof data from the blank of the printing data.

With the objects of the invention in view, there is also provided a system for producing proof data for a blank of a package in an electronic reproduction of packages, including a CAD system producing CAD data, a graphic system producing graphic data, a sheet assembly system connected to the CAD system and the graphic system, the sheet assembly system linking the CAD data and the graphic data to form blank data, producing, from the blank data, printing data describing a printed sheet including at least one blank, and deriving proof data from the at least one blank of the printing data.

With the objects of the invention in view, there is also provided, in an electronic package reproduction system having a CAD system producing CAD data and a graphic system producing graphic data, a proof data producing system for a blank of a package, including a sheet assembly system to be connected to the CAD system and the graphic system, the sheet assembly system linking the CAD data and the graphic data to form blank data, producing, from the blank data, printing data describing a printed sheet including at least one blank, and deriving proof data from the at least one blank of the printing data.

With the objects of the invention in view, in an electronic package reproduction system producing CAD data and graphic data, there is also provided a proof data producing system for a blank of a package including a sheet assembly system linking the CAD data and the graphic data to form blank data, producing, from the blank data, printing data describing a printed sheet including at least one blank, and deriving proof data from the at least one blank of the printing data.

In accordance with a concomitant feature of the invention, the proof data contain all changes to the graphic data from the blank made during production of the printing data.

Other features that are considered as characteristic for the invention are set forth in the appended claims.

Although the invention is illustrated and described herein as embodied in a method and system for producing proof data for package printing, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
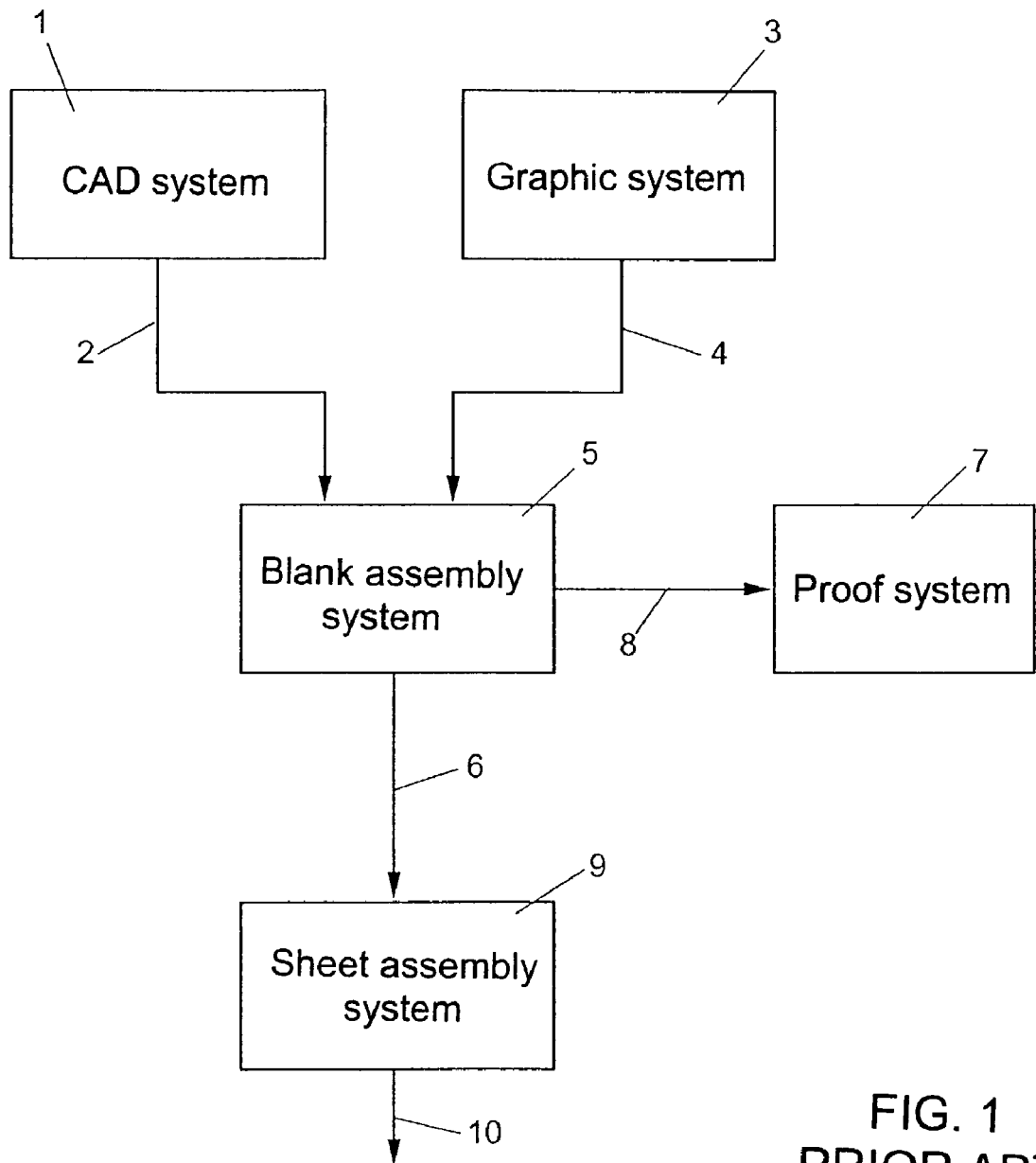
FIG. 1 is a flow chart of a working sequence in a conventional reproduction system for packages.
Figure 2:
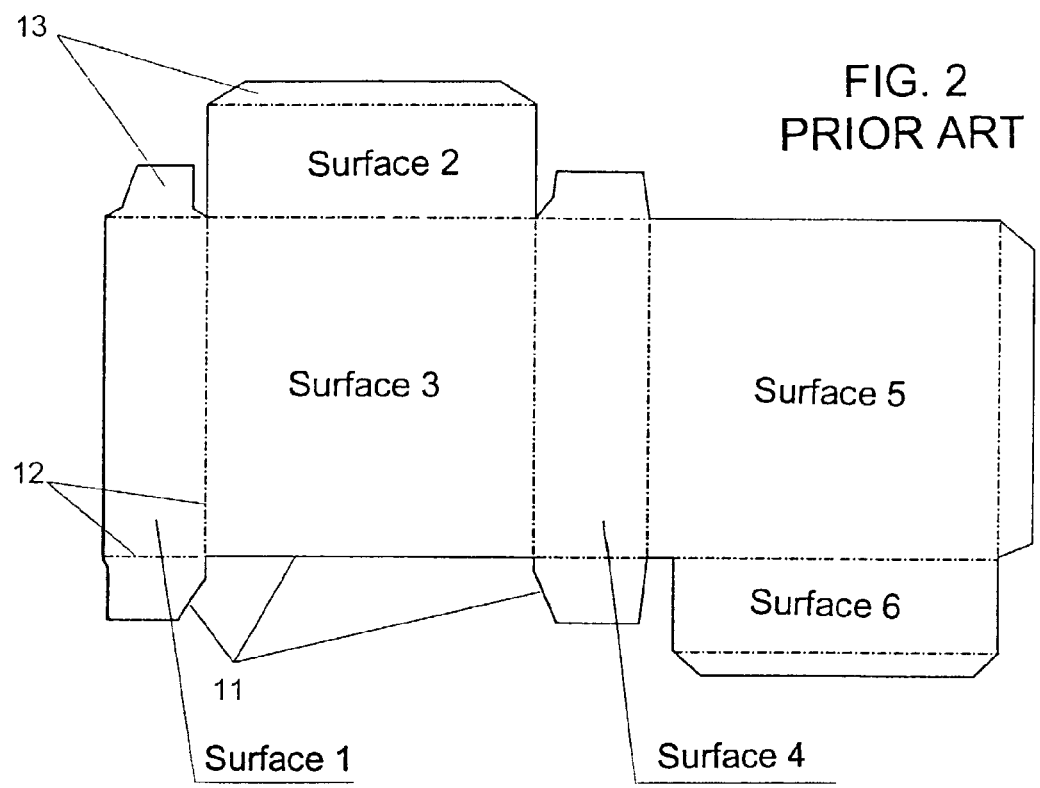
FIG. 2 is a diagrammatic illustration of a folding box constructed by a CAD system.
Figure 3:
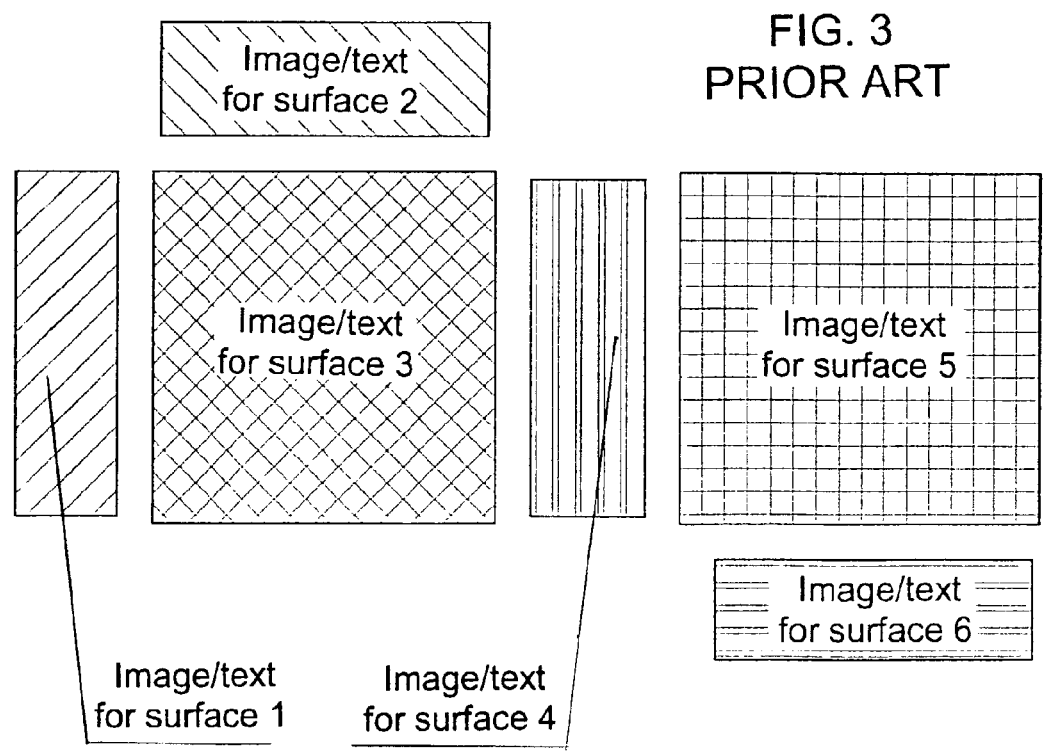
FIG. 3 is a diagrammatic illustration of graphic data produced by a graphic system of FIG. 1 for the surfaces of the folding box.
Figure 4:
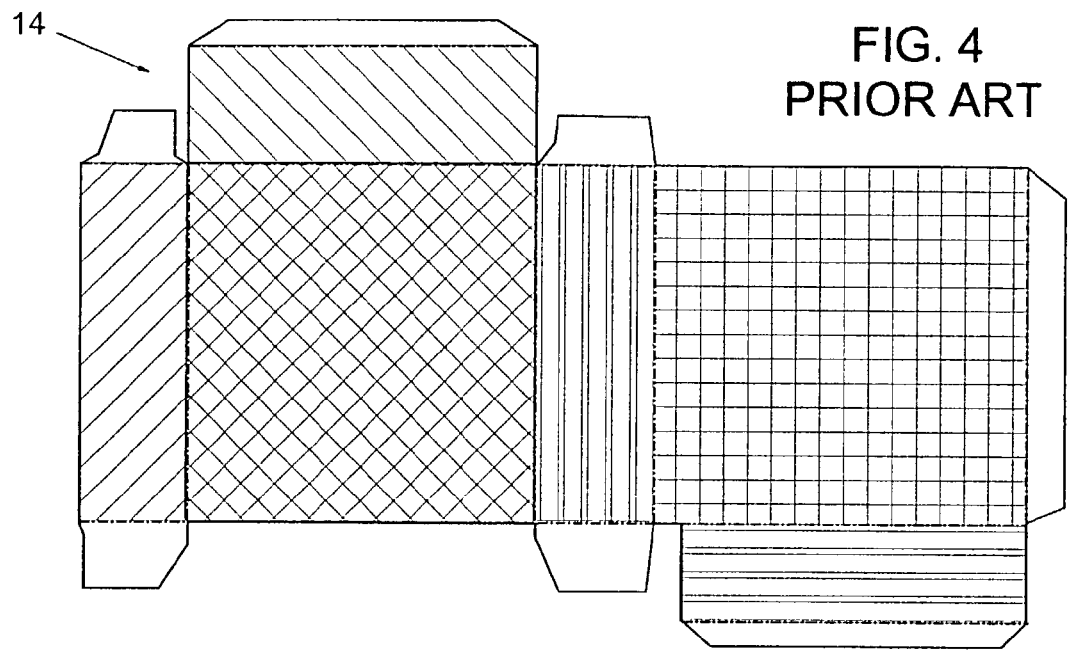
FIG. 4 is a diagrammatic illustration of a blank of the folding box of FIGS. 2 and 3 produced by a blank assembly system of FIG. 1.
Figure 5:
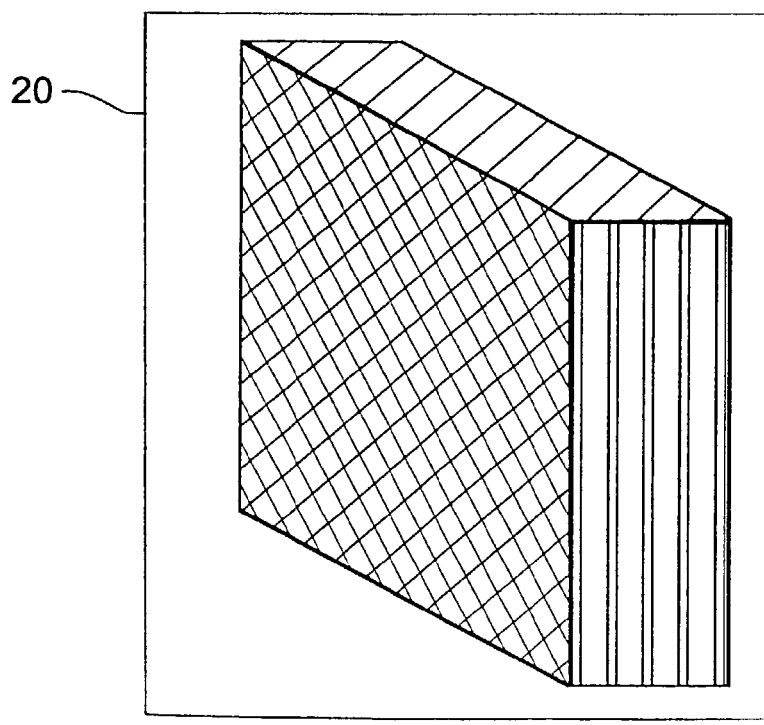
FIG. 5 is a diagrammatic illustration of a three-dimensional proof of the folding box of FIG. 4 displayed by a proof system of FIG. 1.
Figure 6:
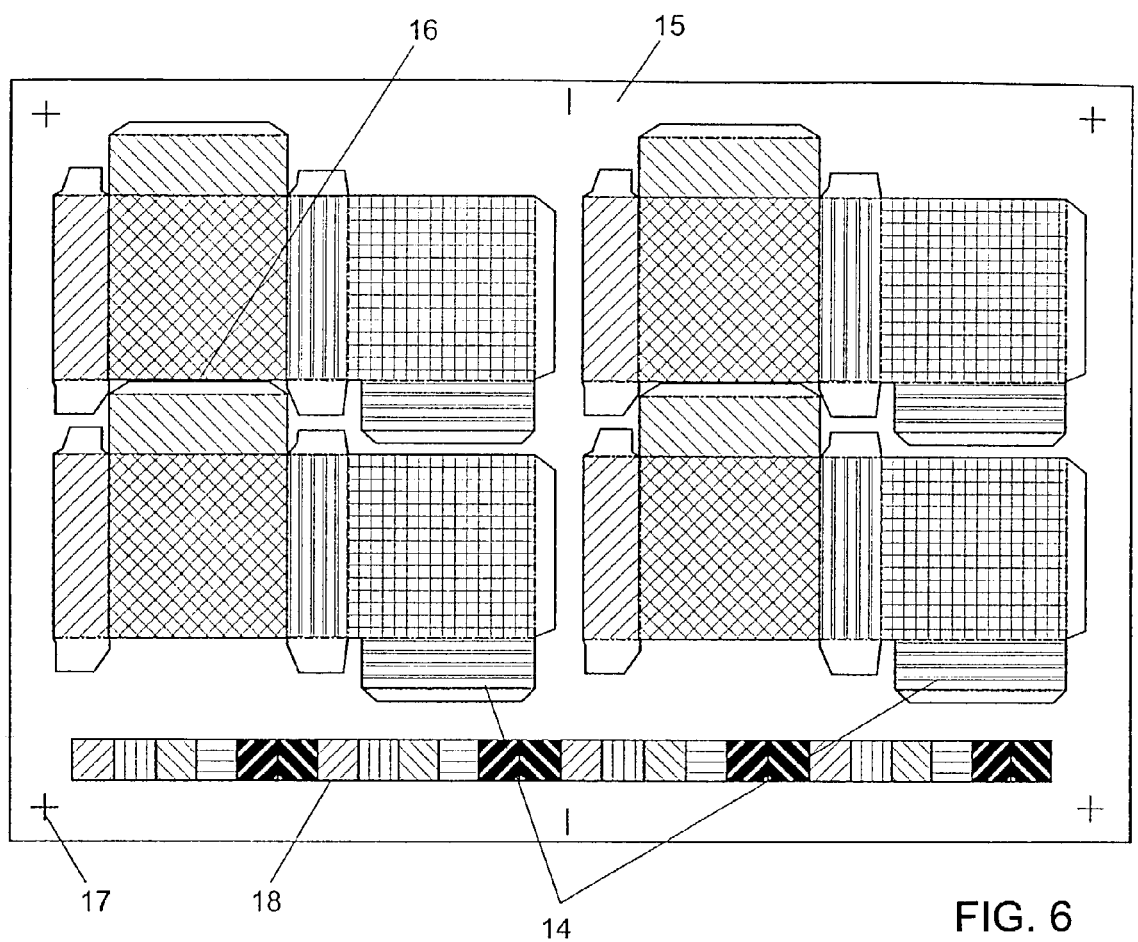
FIG. 6 is a diagrammatic illustration of a printed sheet for a plurality of the folding box of FIGS. 4 and 5 produced by a sheet assembly system of FIG. 1.
Figure 7:
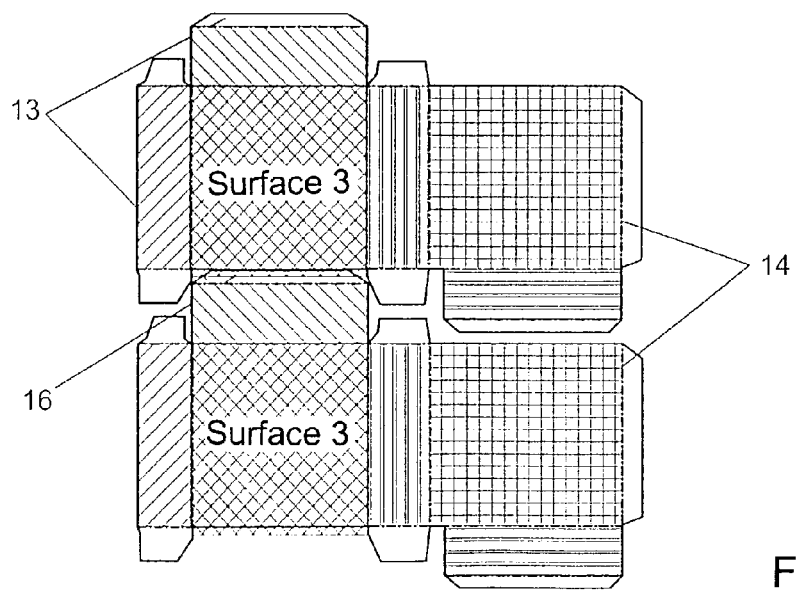
FIG. 7 is a diagrammatic illustration of an enlarged portion of the printed sheet of FIG. 6 with an enlargement of the trim allowance.
Figure 8:
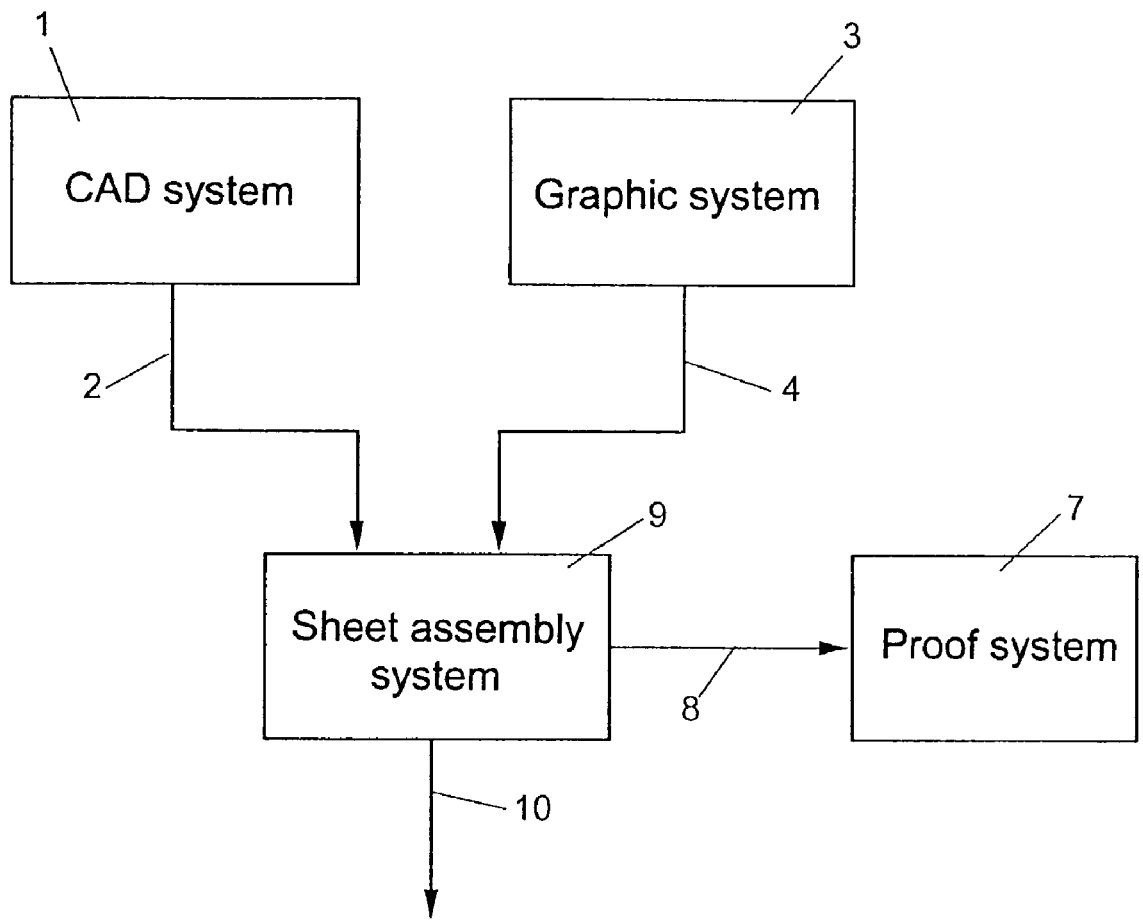
FIG. 8 is a flow chart of a working sequence in a reproduction system for packages according to the invention.

Referring now to the figures of the drawings in detail and first, particularly to FIG. 8 thereof, there is shown the working sequence of the reproduction method according to the invention for packages. The CAD data 2 from the CAD system 1 and the graphic data 4 from the graphic system 3 are supplied directly to the sheet assembly system 9 that produces the printing data 10. In the sheet assembly system 9, the functions of the blank assembly and of the sheet assembly are combined, that is to say, the graphic data 4 are positioned in the surfaces of the unwound package provided for such a purpose, and the blanks 14 so defined are repeated on the printed sheet 15 and positioned together with the print control elements. In addition, all the changes to the graphic data 4 that are required because of production conditions, such as changed trim allowances, are made. Only after such work has been concluded is the proof data 8 from a blank 14 of the finished mounted printed sheet produced and passed on to the proof system 7, the data 8 being selected automatically or by the operator. Such a process ensures that the 2-D proof or 3-D proof displayed or printed out in the proof system 7 always agrees exactly with the final appearance of the package produced.

I claim:

1. A method of producing proof data for a blank of a package in an electronic reproduction system for packages, which comprises:
    linking CAD data and graphic data to form blank data;
    producing, from the blank data, printing data describing a printed sheet having repeated blanks; and
    deriving the proof data from a blank of the printing data.

2. The method according to claim 1, wherein the proof data contain all changes to the graphic data from the blank, the changes having been made during the production of the printing data.

3. The method according to claim 1, which further comprises:
    changing the graphic data during production of the printing data; and
    deriving the proof data from the blank including all the changes made to the graphic data during the production of the printing data.

4. The method according to claim 1, wherein the proof data describes a two-dimensional proof.

5. The method according to claim 1, which further comprises deriving the proof data from the blank of the printing data with the proof data describing a two-dimensional proof.

6. The method according to claim 1, which further comprises describing a two-dimensional proof with the proof data.

7. The method according to claim 1, wherein the proof data describes a three-dimensional proof.

8. The method according to claim 1, which further comprises deriving the proof data from the blank of the printing data with the proof data describing a three-dimentional proof.

9. The method according to claim 1, which further comprises describing a three-dimensional proof with the proof data.

10. The method according to claim 1, which further comprises passing the proof data on to a proof system for output.

11. The method according to claim 1, which further comprises outputting the proof data by passing the proof data on to a proof system.

12. The method according to claim 1, which further comprises outputting the proof data through a proof system.

13. A method of producing proof data for a blank of a package, which comprises:
    providing an electronic reproduction system for packages;
    linking CAD data and graphic data with the electronic reproduction system to form blank data;
    providing a sheet assembly system;
    producing, by the sheet assembly system, printing data describing a printed sheet utilizing the blank data, the printing data describing at least one blank; and
    deriving proof data from the blank of the printing data.

14. A system for producing proof data for a blank of a package in an electronic reproduction of packages. comprising:
    a CAD system producing CAD data;
    a graphic system producing graphic data;
    a sheet assembly system connected to said CAD system and said graphic system, said sheet assembly system:
        linking said CAD data and said graphic data to form blank data;
        producing, from said blank data, printing data describing a printed sheet including at least one blank; and
        deriving proof data from said at least one blank of said printing data.

15. The system according to claim 14, wherein said proof data contain all changes to said graphic data from said blank made during production of said printing data.

16. In an electronic package reproduction system producing CAD data and graphic data, a proof data producing system for a blank of a package, comprising:
    a sheet assembly system:
        linking the CAD data and the graphic data to form blank data;
        producing, from said blank data, printing data describing a printed sheet including at least one blank; and
        deriving proof data from said at least one blank of said printing data.

17. In an electronic package reproduction system having a CAD system producing CAD data and a graphic system producing graphic data, a proof data producing system for a blank of a package, comprising:
    a sheet assembly system to be connected to the CAD system and the graphic system, said sheet assembly system:
        linking the CAD data and the graphic data to form blank data;
        producing, from said blank data, printing data describing a printed sheet including at least one blank; and
        deriving proof data from said at least one blank of said printing data.

* * * * *